US007821700B2

(12) United States Patent
Miles

(10) Patent No.: US 7,821,700 B2
(45) Date of Patent: Oct. 26, 2010

(54) DYNAMIC MOTILE MEDIUM

(76) Inventor: Mark W Miles, Bldg. 43, Fort Mason, San Francisco, CA (US) 94123

( * ) Notice: Subject to any disclaimer, the term of this patent is extended or adjusted under 35 U.S.C. 154(b) by 55 days.

(21) Appl. No.: 11/094,852

(22) Filed: Mar. 31, 2005

(65) Prior Publication Data
US 2006/0227408 A1    Oct. 12, 2006

(51) Int. Cl.
G02B 26/00 (2006.01)
G09G 3/34 (2006.01)
G03G 17/04 (2006.01)

(52) U.S. Cl. .................. 359/296; 345/107; 430/32
(58) Field of Classification Search .......... 359/296; 345/107; 430/31, 32
See application file for complete search history.

(56) References Cited
U.S. PATENT DOCUMENTS 3,767,392 A * 10/1973 Ota ........................ 430/35
4,093,534 A * 6/1978 Carter et al. .............. 359/296
4,261,653 A * 4/1981 Goodrich .................. 359/296
4,648,956 A * 3/1987 Marshall et al. ........... 359/296
6,323,989 B1 * 11/2001 Jacobson et al. ........... 359/296
6,873,451 B2 * 3/2005 Ukigaya ................... 359/296
2003/0007238 A1 * 1/2003 Liang et al. ............... 359/296
2004/0227985 A1 * 11/2004 Kishi et al. ............... 359/296
2006/0152472 A1 * 7/2006 Nishiyama et al. ......... 345/107
2007/0052666 A1 * 3/2007 Tanuma et al. ............ 345/107
2007/0070028 A1 * 3/2007 Zhou et al. ................ 345/107

* cited by examiner

Primary Examiner—Scott J Sugarman
Assistant Examiner—Dawayne A Pinkney
(74) Attorney, Agent, or Firm—Hahn & Moodley LLP; Vani Moodley, Esq.

(57) ABSTRACT

In one embodiment of the invention there is provided a device for modulating light. The device comprises a plurality of nano-scale particles; a conformal structure defining a surface to which the nano-scale particles conform under influence of a displacement force; and a displacement mechanism to apply the displacement force to the nano-scale particles; wherein the nano-scale particles when they conform to the conformal structure change the optical characteristics of the conformal structure.

16 Claims, 8 Drawing Sheets

Step 1 Procure Nano-powder

Step 2 Mix with polymer

Step 3 Apply and cure

Step 4 Eliminate polymer

Step 5: Encapsulate

DYNAMIC MOTILE MEDIUM

FIELD

Embodiments of this invention relate to light modulating devices in general, and in particular to light modulating devices that operate on the principles of diffraction and/or interference, and may be classified as transmissive or reflective devices.

BACKGROUND

Electrophoretic devices such as those illustrated in U.S. Pat. No. 6,392,785 fall into the class of microencapsulated displacement types, and spinning or re-orientation types. In the former, charged submicroscopic particles contained within fluid filled transparent micro-shells, can be physically displaced under the influence of an electrical field. Depending on the color of the fluid and the color of the particles, a viewer looking at a sheet containing a dense array of such microshells will see a change in brightness from a dark state to a light state. In the latter, a permanent bipolar charge placed on microscopic sphere can be rotated under the influence of an applied field. If one side of the particle is black and the other white, the appearance of this device also changes with an applied voltage.

In both cases, the size of the particles, length of the required displacement, and viscosity of the supporting fluidic medium all contribute to relatively high voltages (approximately 30V-100V) required to drive the devices. Additionally, it is costly to incorporate color into the resulting media since this generally requires the addition of a costly color films. Speed is also an issue, for the aforementioned reasons.

Another similar approach, based on "liquid powder" offers a similar mode of operation. Analogous to the displacement version of the electrophoretic approach, this device relies on oppositely charged particles of opposite brightness that are physically displaced between two transparent electrodes. A change in brightness is the result. This change occurs at high speed because there is no liquid medium, the particles move through air, with response times of 100 microseconds achievable. High voltages of 80V-150V, due to the required large dimensions between electrodes, and costly color also constrain the capabilities of this device.

U.S. Pat. No. 6,215,920 describes an optical modulator whose primary optical principle is that of total internal reflection. A corner-cube reflector directs incident light back to the source by exploiting the total internal reflection (TIR) at the walls of the corner-cube. Particles which are brought into contact with the walls can spoil or degrade the TIR, thus reducing reflectivity significantly and the overall reflection of the structure. This approach, while offering the prospect of very high inherent reflectivities, does not incorporate a means for color selection. The design is further complicated by the tradeoff between positioning of the drive electrodes which could either degrade reflectivity (if located on the walls) or increase voltage (if located on the incident plane of the corner cube).

SUMMARY

According to one aspect of the invention, there is provided a device for modulating light, comprising: a fixed geometry component to modulate light, said component providing at least one conformal surface; and a plurality of motiles that are displaceable to conform to the conformal surface, an optical response of the fixed geometry component to incident light when the motiles conform to the conformal surface being different from when the motiles do not conform to the conformal surface.

According to another aspect of the invention there is provided a device for modulating light, comprising: a light modulating component in the form of a walled structure defining a cavity, said walled structure having an upper and a lower wall, a spacing between the upper and lower walls being fixed; a plurality of movable particles located within the light modulating component; and a displacement mechanism to cause the movable particles to move from a non-activated condition to an activated condition in which the movable particles conform to at least one of the upper and lower walls, an optical response of the light modulating component to incident light when in the movable particles are in the activated condition being different from when the movable particles are in the non-activated condition.

According to yet another embodiment of the invention there is provided a device modulating light, comprising: a plurality of nano-scale particles; a conformal structure defining a surface to which the nano-scale particles conform under influence of a displacement force; and a displacement mechanism to apply the displacement force to the nano-scale particles; wherein the nano-scale particles when they conform to the conformal structure change the optical characteristics of the conformal structure.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
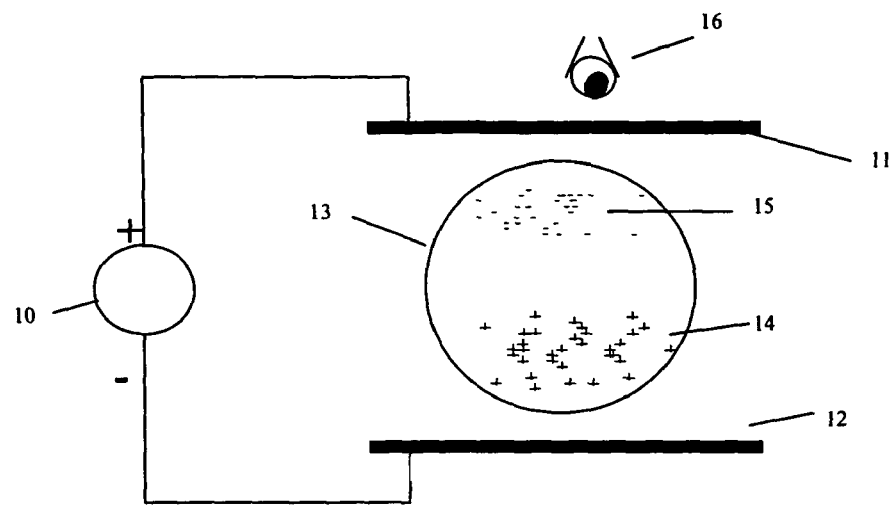
FIG. 1 of the drawings shows an example of prior art illustrating a displacement type electrophoretic modulator.

Referring to FIG. 1 of the drawings, one variation on an electrophoretic modulator is illustrated. Voltage source 10, applies an electric field to electrodes 11 and 12. This field acts on charged particles groups 14 and 15, which are charged positively and negatively respectively, and contained in a transparent microshell 13, which is suspended within a fluid contained by the microshell 13. Depending on the optical transmissivity of the fluid, and the color of the particles, the viewer 16, will see different colors depending on the applied voltage. For example, if the fluid is transparent, and the negatively charged particles are colored black, while the positively charged particles are colored white, the microshell will appear black in the state as illustrated.

Figure 2:
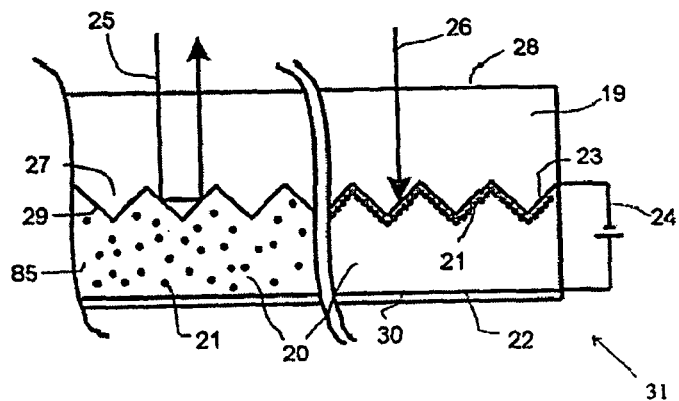
FIG. 2 of the drawings shows an example of prior art illustrating a TIR based modulator with movable particles.

Referring to FIG. 2, a corner cube reflector is shown with light 25, reflecting from the walls 29, and particles 21 suspended away from the walls. With particles 21, brought into contact with walls 23 via the application of a voltage 24, TIR is defeated, and light 26, is not reflected.

Figure 3:
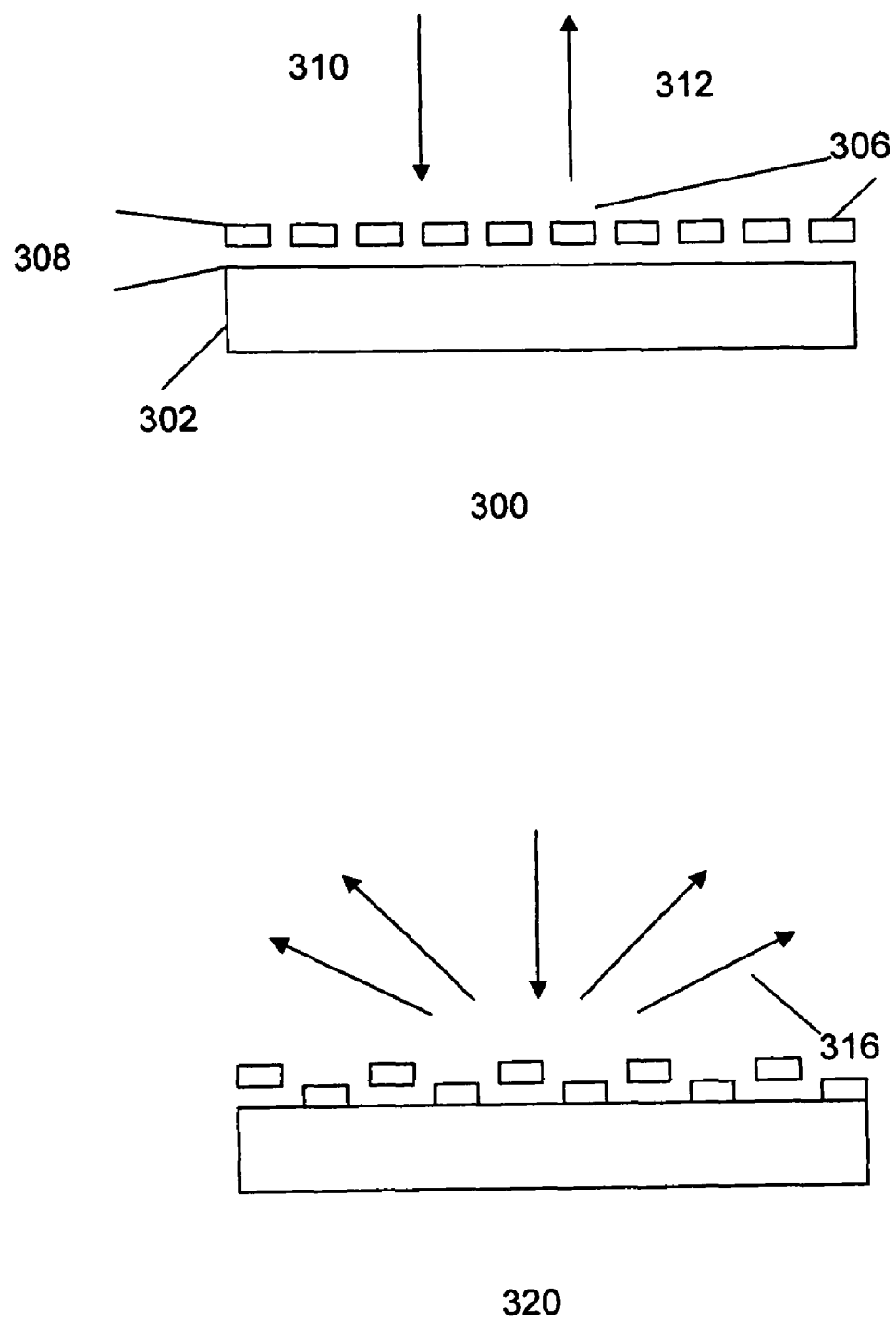
FIG. 3 of the drawings is an example of prior art illustrating a diffraction based modulator FIG. 4 of the drawings illustrates a motile based cavity which exploits diffraction, in accordance with one embodiment of the invention.

Referring to FIG. 3, a structure known as a grating light valve is illustrated. Light valve 300, is shown in the undriven state wherein grating fingers 306 are suspended above reflecting substrate 302. The grating fingers 306 are reflective. Spacing 308 between the grating 306 and the reflecting substrate 302 is such that the grating behaves as a flat mirror to incident light 310, producing reflected light 312 with minimal losses. Application of a voltage between the reflecting substrate 302, and alternating grating fingers 306, causes half of the fingers to be drawn into contact with the reflecting substrate 302. Light valve 320, illustrates the resulting configuration, which acts as a reflecting diffraction grating, scattering reflected 316, at varying angles depending on the color.

Figure 4:
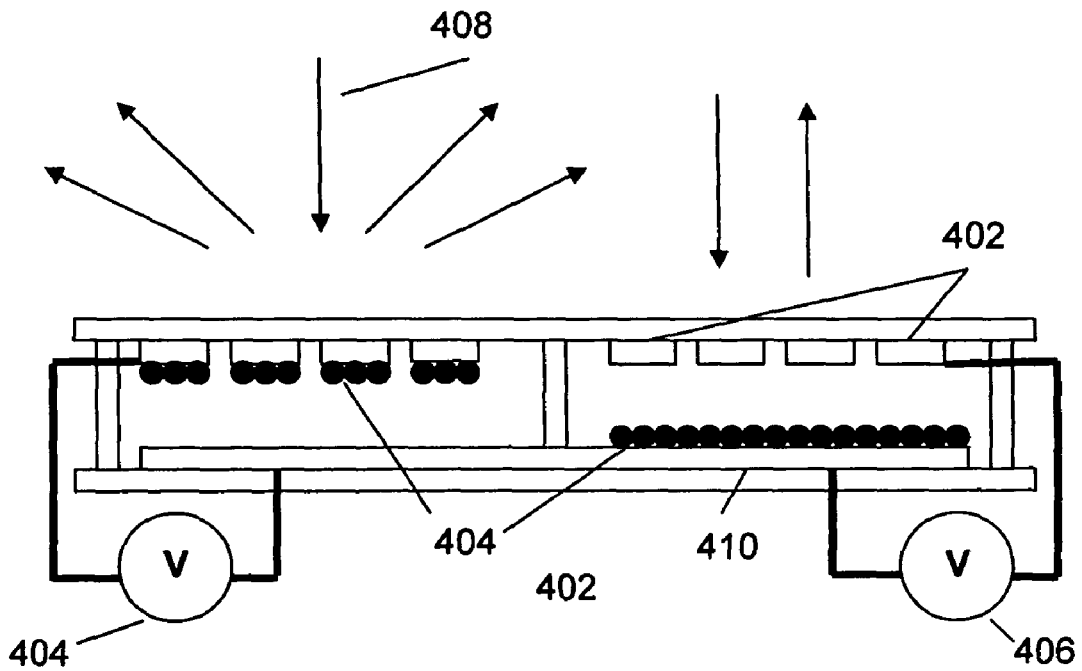

Referring to FIG. 4, a diffraction mode motile modulator is illustrated. Analogous to the light valve of FIG. 3, similar optical behavior can be achieved with the application of a voltage, but without the complexity of patterning and controlling the properties of grating fingers. Transparent conductors 402 have dimensions similar to the grating fingers 306, but are transparent. Thus the transparent conductors 402 have no effect on incident light when voltage 406 is applied. When voltage 404 is applied between transparent electrodes 402 and reflecting electrode 410, the motiles 404 migrate, align and adhere to the electrodes 402 to form a grating which acts on the incident light 408, in a diffractive fashion according to the dimensions of the grating.

Figure 5:
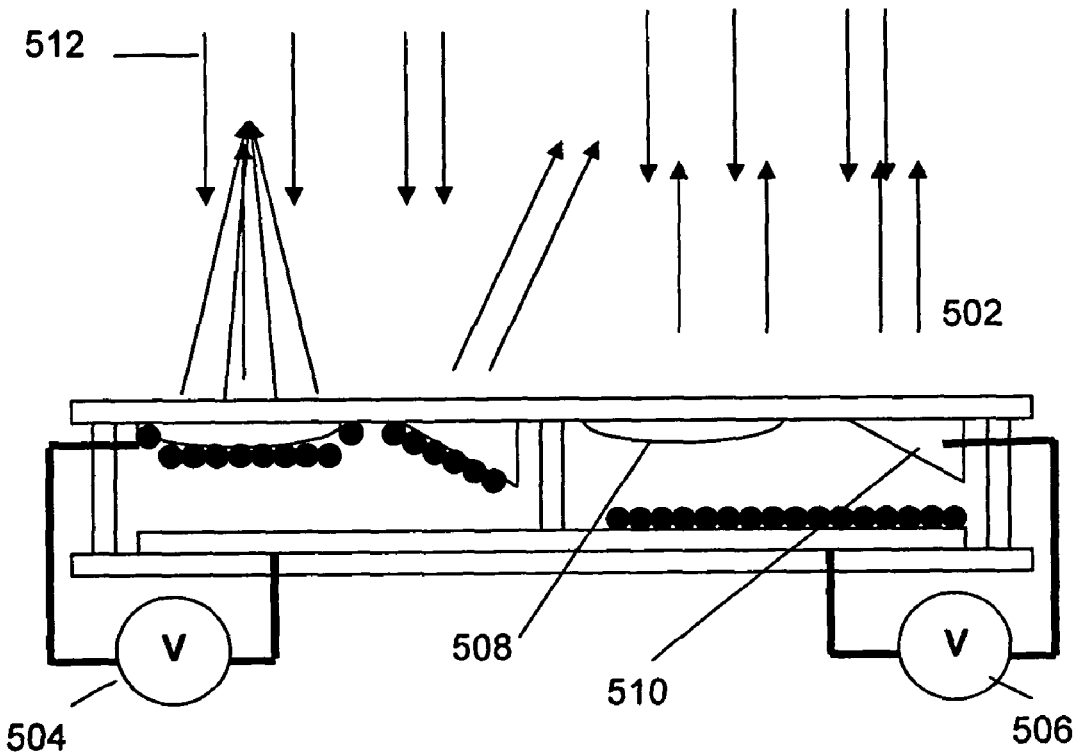
FIG. 5 of the drawings illustrates a multifunction motile based cavity which exploits reflectivity, in accordance with one embodiment of the invention.

Referring to FIG. 5, a more generalized motile based modulator is shown. According to embodiments of the invention, any two-dimensional or three-dimensional template, cavity, or periodic structure can have dynamic optical behavior if the material and optical properties of its surfaces can be altered by the displacement of a movable material, or a field of motiles. In one embodiment of the invention, any optically neutral structure that has a physical form or can be precisely defined, for example using a microscopic or submicroscopic mold, acts as a fixed geometry component or template which provides a conformal surface for motile particles. So that application of a voltage creates a motile shell which takes the form of the template. The motile shell is a temporary structure that acts on light in accordance with the geometry of the template, and the optical and material properties of the motile medium. Possible devices include reconfigurable photonic crystals, reconfigurable reflective, refractive, diffractive, optics, and reconfigurable sub-wavelength structures. The modulator in FIG. 5 includes a parabolic component 508, and a wedge-shaped component 510. With voltage 506 applied, incident light passes through these components without effect. A suitable displacement mechanism causes the motile field to migrate and conform to the surface of these optical components thus changing their optical properties. The displacement mechanism may take the form of an electrostatic, magnetic, thermal, or acoustic displacement mechanism. In the case of an electrostatic displacement mechanism a voltage 504 may be applied to cause migration of the motiles. Migration of the motiles causes the component 508 to become a parabolic reflector, and the component 510 to become a wedge reflector, with each acting on the incident light in the appropriate fashion.

Figure 6:
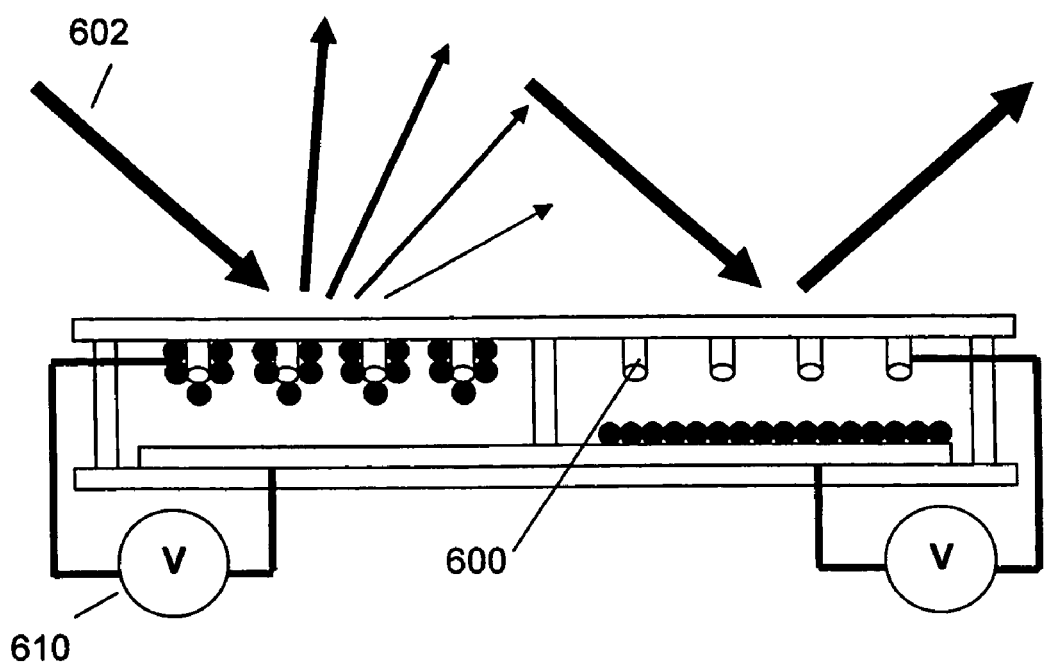
FIG. 6 of the drawings illustrates a motile based photonic crystal modulator, in accordance with one embodiment of the invention.

Referring to FIG. 6, yet another motile-based modulator is shown to include forms and structures 600 which may be formed by a mass replication technique such as embossing, micro-embossing, stamping, electroforming, thermoforming, printing, and injection molding. The forms and structures 600 may themselves be sub-micron in size. With proper design, the forms and structures 600 are capable of acting on light in an interferometric and/or diffractive way, not unlike that of a photonic crystal. The modification of the properties of the forms and structures 600 by the electrostatic displacement of appropriate motiles under an applied voltage 610 can alter the optical behavior of the forms and structures 600 in advantageous ways, thus allowing for the redirection and/or modification of light 602, which is incident on the structure. Arbitrary structures similar to the structures 600 may be formed to alter one or more of frequency, phase, amplitude, and exit angle of incident light and reconfigured if the material and dimensional properties are properly defined, in accordance with the techniques disclosed above, The film or form may be of any shape or form, as long as the dimensions between it and the counter-film can be defined and maintained. This includes flat, curved, cylindrical or fiber like, and spherical. Many other configurations are possible and limited only by the ability to define the molds and generate and incorporate the appropriate motile materials.

Based on the foregoing, embodiments of the invention include displacing the motiles from a quiescent or non-activated condition to an activated condition in which the motiles conform to a conformal surface provided by one of the above-described structures that acts as a template. The displacement is by a displacement mechanism that can include an electrostatic displacement mechanism. In one embodiment, the motiles may be randomly orientated when in the non-activated condition. In one embodiment, the optical characteristics of a modulator that uses the motiles changes as soon as the motiles begin to move under influence of the displacement mechanism.

Figure 7:
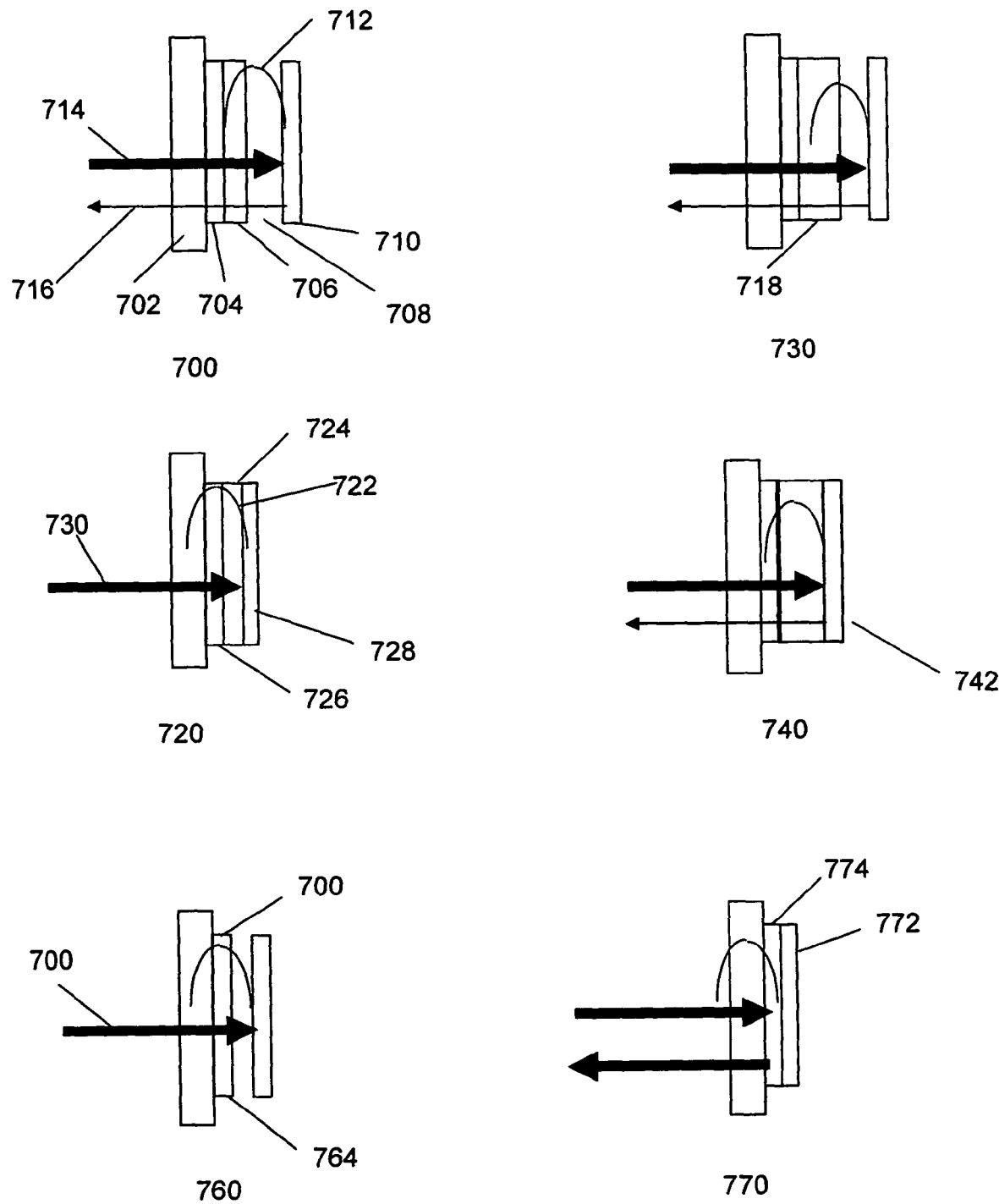
FIG. 7 of the drawings illustrates the optical behavior of an interference based cavity.

Referring to FIG. 7, three modes of operation are illustrated for an interferometric cavity. Cavity 700 is shown schematically as a stack of components comprising a transparent substrate 702, an absorbing semitransparent film (such as a lossy metal) 704, an insulator/spacer (such as a metallic oxide) 706, airgap 708, and a movable mirror (also a metal) 710. Light 714, which is incident on the cavity produces a standing wave 712, whose peak, resides within the airgap 708 and is consequently not attenuated. A particular frequency of light is reflected, with the frequency determined by the size of the air gap. The film 704, contains materials such as metals, which are highly absorbing. When the movable mirror 710 is brought into contact with the insulator/spacer, as shown in modulator 720, the peak of standing wave 722 is displaced. Proper design of the insulator/spacer causes the peak to reside in the induced absorber 726, resulting in attenuation, and the elimination of reflected light.

In cavity 730, insulator/spacer 718, is enlarged, such that when the movable mirror 742, is brought into contact, as shown in cavity 740, the standing wave peak does not reside in the lossy metal. Thus, instead of switching from a reflecting mode to an absorbing mode, the cavity switches between reflecting one color, and reflecting another color.

Cavity 760 is shown without an insulator/spacer. In the undriven state, the dimensions of the cavity are chosen such that the standing wave peak 762, resides within the lossy metal 764. Thus no light is reflected. When the movable mirror 772, is brought into contact with the induced absorber 774, as shown in cavity 770, the cavity acts as a mirror. Thus much light is reflected with minimal losses.

Figure 8:
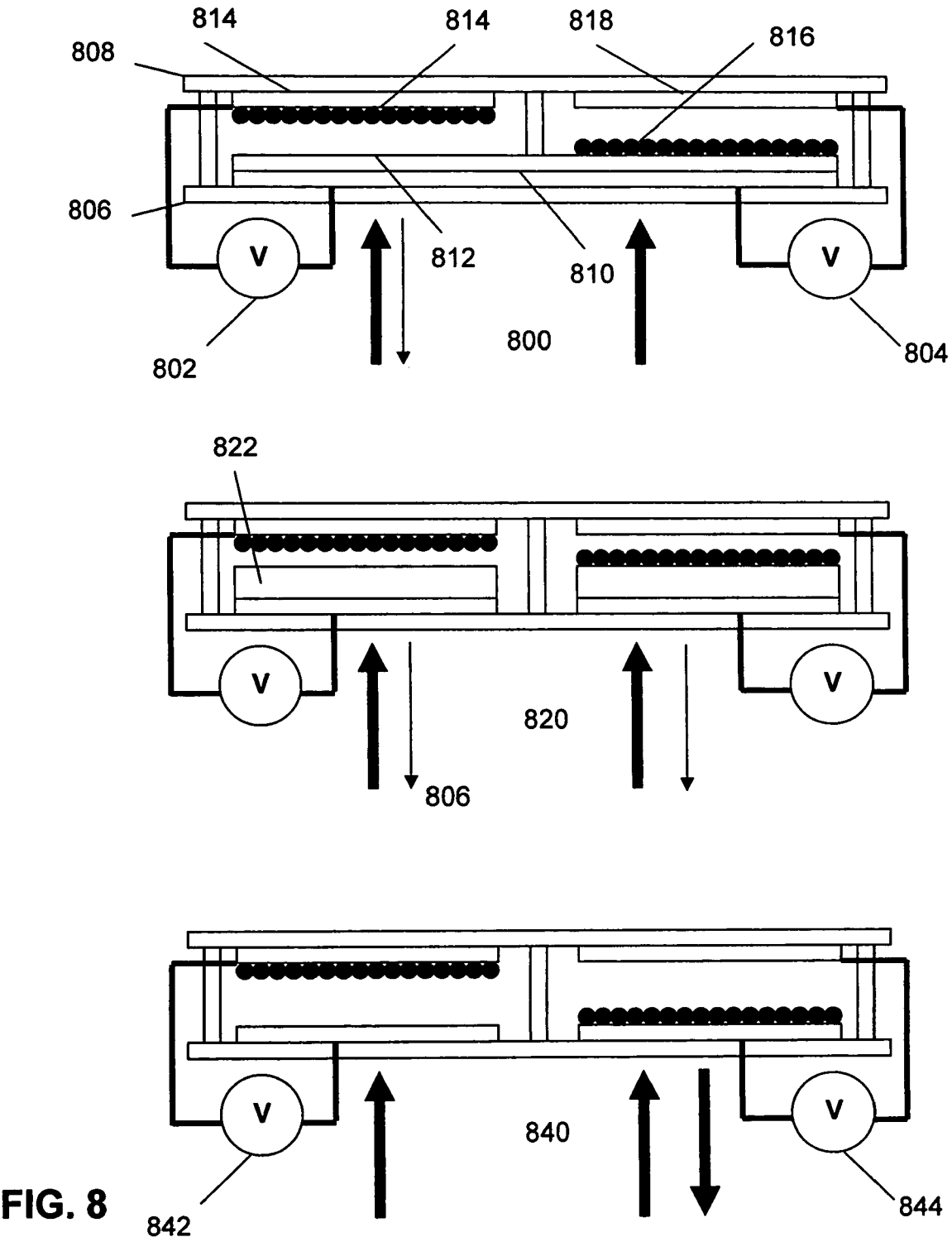
FIG. 8 of the drawings illustrates a motile based cavity which exploits interference, in accordance with one embodiment of the invention.

A motile modulator is illustrated in FIG. 8. A cavity structure analogous to that shown in FIG. 7 is shown. In modulator pair 800, voltages 802 and 804 are applied between electrodes 814/818, and lossy metal 810. These components are patterned and deposited on films 806 and 808. The spacing between the films is such that light which is incident on the cavity is acted on via interference. The cavity may contain a fluid of organic or inorganic composition, a gel of similar composition, or may be comprised of a gas or vacuum. Motiles 814 and 816, are collections of nano-scale structures which can range from three-dimensional particles to flat two-dimensional and plate like in their geometry. For interferometric applications involving light in the visible range, and particle like motiles, their size should be less than 100 nm, with smaller sizes reducing scattering effects. For two-dimensional motiles, the thickness is less important, but the surface roughness must be less than 100 nm. The motiles may be conducting, semiconducting, or insulating. The motiles may also carry a fixed charge, or be capable of acquiring a charge. Because the motiles are mechanically decoupled from any of the surrounding structures and walls, they are free to move under the influence of an applied electric field, though other mechanisms of actuation including magnetic, thermal, or acoustic means of actuation are possible. Consequently, the optical properties of the cavity can be manipulated by the positioning of the motiles.

In the case of FIG. 8, the motiles are metallic, preferably a metal with high reflectivity such as aluminum or sliver. With voltage 802 applied, an optical effect like that shown in cavity 700 of FIG. 7 can be achieved if the cavity dimensions are comparable. Similarly with voltage 804 applied, the optical effect illustrated in cavity 720 of FIG. 7 can be emulated. Motile modulators 820 and 840, are configured to emulate the behavior of cavities 730/740 and 760/770 respectively. Modulator 820 incorporates thicker spacer 822, such that the associated standing wave always remains unattenuated. Modulator 840 contains no spacer, and the cavity dimensions are such that with voltage 842 applied a dark state is achieved, and with voltage 844 applied, a white state is achieved. The cavity structures are identical, but instead of a movable mirror a motile field is displaced.

Behavior of the motiles in such cavities will be influenced by their composition. For metallic motiles, an attractive force is experienced until they move into contact with the opposite electrode whereupon they are charged to the polarity of that electrode and are no longer pulled. A similar phenomenon occurs with insulating motiles, though the process of charging to the opposite polarity takes longer as they are insulating. Consequently, selection of particles of different degrees of conductivity provides a means for manipulating the electrodynamic behavior of the motiles and therefore the dynamic optical behavior of the modulator. Similarly for motiles which have inherent charge, the level of charge will have an effect on the behavior of the structure. Under certain circumstances, with the application of a certain voltage or voltage sequence in conjunction with motiles of the appropriate material, it is possible to dynamically manipulate the charge within the motiles. This adds another means for manipulating behavior. The combination of one or more of these techniques can enable the manifestation of an electro-fluidic hysteresis. Allowing the establishment of a voltage switching threshold and facilitating addressing using line-at-a-time techniques which are known generally for those who design and utilize devices which are configured as addressable arrays.

Figure 9:
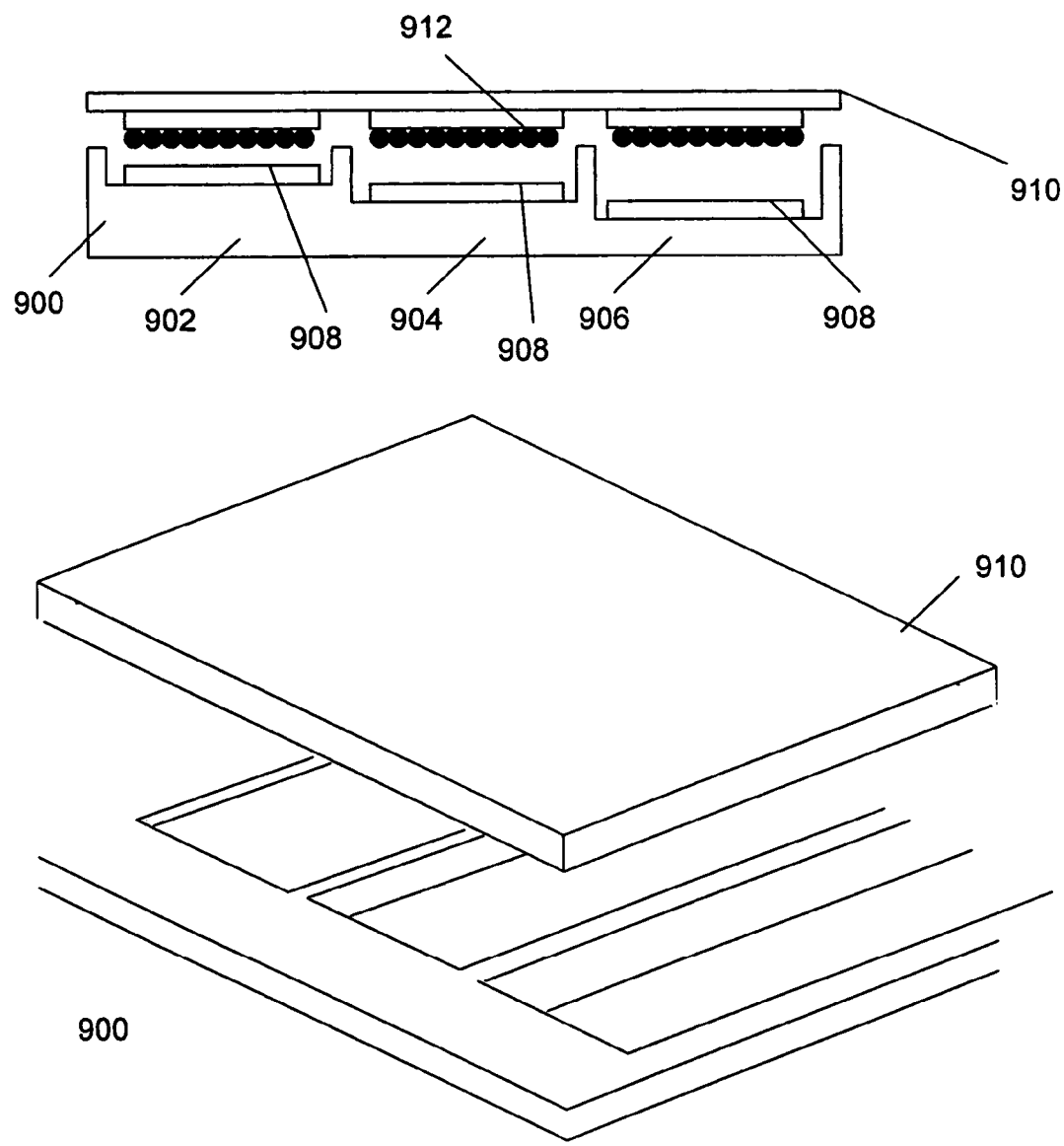
FIG. 9 of the drawings illustrates a multicolor motile based cavity which exploits interference, in accordance with one embodiment of the invention.

Referring to FIG. 9, a three color motile modulator pixel is shown with three different cavity gaps, 902, 904, and 906. Pixels with as few as one cavity or more than three are also possible depending on the color requirements of the application. The film material, 900, could be of any number of materials that are easily formed using embossing, stamping, or micro-replication. These include plastics such as polycarbonates, PMMA, polyimides, or thermoplastics. Metal foils may also be utilized though they might require a special surface treatment for feature insulation. For stamping or embossing, a suitable mold is defined using a precision machining tool to define the depth of the cavities and lateral dimensions of the electrode wells or channels. Then one of the many stamping or embossing processes, which are well known in the art, is utilized. Special emphasis is placed on compensating for any shrinkage during curing so that the proper vertical cavity dimension is achieved.

Common electrode 908, may not be required if the film 900 is conducting as in the case of the foil. Counter film 910, is flat, and supports the other components, such as addressing electrode 912, which for an interference mode device could include a lossy metal and possibly and insulator spacer (or other appropriate structures for diffractive, reflective or photonic crystal behavior). Counter film 910 should be of a transparent material such as the aforementioned plastics or glass. Alternatively, film 906 could be transparent while counter film is not, or both films may be transparent. In all cases at least one film must be transparent, and by necessity this is the film which must support the optically active thin films (i.e. lossy metal and/or insulator).

The exposed surface of counter film 910 may also have a pattern etched or stamped into it to enhance optical properties. These could be diffuser, lens, or grating like structures. Properties such as viewing angle, contrast, and irridesence could be modified with the proper treatment. The inner surface of counter film 910 may also incorporate topography in the manner of the structures 508 and 510 in FIG. 5. Further modifications to optical performance may be achieved when the motiles are driven and conform to the features of counter film 910.

From a manufacturing standpoint, modulating media based on dynamic motiles are advantageous because they 912 achieve the manufacturing simplicity and cost structure of electrophoretic style media. This derives in part from the fact that they combine readily available motiles in the form of volume manufactured nano-powders, with fixed cavity structures whose dimensions can be defined using cost effective stamping, embossing, or micro-replicating techniques among others.

Nano-powders are available from a wide and growing variety of manufacturers that include Inframet Advanced Materials of Farmington, Conn., and Sigma-Aldrich of St. Louis, Mo. One standard product of the latter is a silver nano-powder with particles on the order of 70 nm in diameter.

Figure 10:
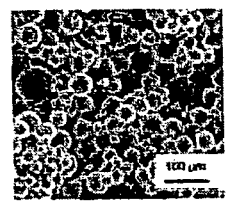
FIG. 10 of the drawings illustrates one embodiment of a manufacturing sequence, in accordance with one embodiment of the invention.
Figure 10:
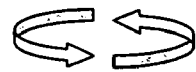
Figure 10:
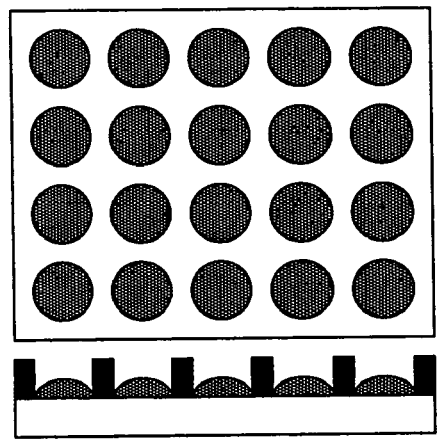
Figure 10:
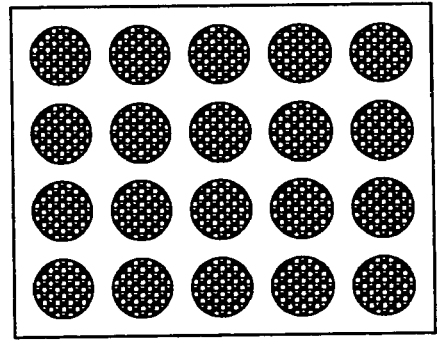
Figure 10:
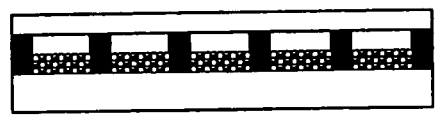

Referring to FIG. 10, one embodiment of a manufacturing sequence is illustrated. In step one, a nano-powder of a particular material is selected on the basis of the desired optical, physical, and dimensional properties. In step two the nano-powder is mixed with a liquid polymer solute which may or may not be photodefinable. In one embodiment, the solute component may be organic. The ratio of the mixture is determined by the amount of nano-powder desired per unit volume in the resulting device. In step three, the resulting mixture is applied to an embossed film, for example by printing. Thereafter a curing process is used to drive off the bulk of the solvent. Step four relies on any one of well known low temperature techniques for converting organic materials into gaseous byproducts. Such low temperature techniques include oxygen plasma etching, and UV ozone cleaning among others. These techniques allow the resulting motile aggregates to reside in the locations in which they were "printed" without relocation which would result if a wet dissolution process were utilized. Step five demonstrates the encapsulation of the film with a counter film which has been treated or otherwise processed for the desired application.

Ink-jet or other printing techniques may also be utilized to effectively deposit and pattern the motile aggregates. These could be suspended in a solvent and printed like an ink at the required location on the film. Alternative but related techniques also involve the placement of motile aggregates by printing, ink-jet or other means. In one embodiment, a mixture of a photo sensitive prepolymer and the nano-powder may be printed at the selected locations. Proper composition of this mixture and subsequent exposure to a UV source can result in photo enforced stratification. The result is the motile aggregate is suspended within a polymeric capsule. This technique is described for application to LC materials in a paper entitled, "Inkjet Printed LCDs" J. P. A. Vogels, et al, Proceedings of the 11$^{th}$ International Display Workshops, Niigatta, Japan, 2004.

Electrodes, mirrors, and spacers, may be easily deposited and patterned using conventional deposition techniques, such a sputtering or plating, and patterning techniques such as micro-lithography and printing. At the same time, some of the challenges of fabricating MEMS structures are avoided. These include stress control in movable components, dimensional control using highly uniform deposited sacrificial materials, and the process issues associated with combining these and other steps. Performance requirements for insulating materials including integrity, continuity, breakdown voltage and leakage currents, are also relaxed, compared to the MEMS devices. This is because the motiles are not continuously electrically coupled. Therefore issues of shorting are between a movable and permanently coupled component and the cavity structures (as in the conventional MEMS approach) are avoided.

Such modulators can be fabricated in large arrays on flexible sheets of plastic or other materials. This sheet may then be applied or adhered to virtually any surface whereby it may be used to electronically alter the appearance of that surface, or portray information in the form of dynamic two-dimensional media. The film is also flexible, again depending on the material, and therefore suitable for applications where the film or "dynamic reflective motile medium" can be applied to curved or arbitrary surfaces, which may or may not be flexed during the course of their use.

Applications include all kinds of visually perceived media ranging from labels on cans, bottles, and other consumable goods. Packaging for products, goods, parts, and parcels thereof that convey any kind of graphical, textual, or visually conveyed impression, concept, picture, or information. Clothing or goods made from fabrics or other flexible materials. Any product which has as one function to serve a decorative, informational, or hybrid function such as product exteriors and housings, walls, furniture, jewelry, surfboards snowboards. Electronic product exteriors or portions thereof that are viewed by the user and/or others. Vehicles, such as motorcycles, trucks, and automobiles. The interior/exterior walls of buildings and other permanent or semipermanent structures. Photonic materials designed to manipulate light and other forms of electromagnetic radiation are possible. Frequency sensitive mirrors whose behavior in the reflection vs. frequency space may be reconfigured, coatings for energy efficient glass used in skyscrapers, or contrast and brightness controlled sunglasses are possible.

Dynamic media from small to large format ranging from timepieces, books and magazines, TV sized to kiosk, billboard, and beyond. Any part, or product, or consumer good of any sort whose external appearance is considered an important characteristic can have its surface treated or coated with a motile media film, and have its appearance modified in a controlled fashion. Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A device for modulating light, comprising:
an enclosure to enclose a plurality of motiles;
an optically neutral fixed geometry component located within the enclosure, shaped and dimensioned to provide a conformal surface, wherein the fixed geometry component comprises three walled structures disposed in a linear configuration, each walled structure defining a cavity, wherein one of the walls of each structure forms the conformal surface, and wherein each walled structure is of a different size and produces a different optical response to incident light when said motiles conform to the conformal surface thereof; and
a displacement mechanism to displace the motiles to form a motile shell on the conformal surface, the motiles altering the optical properties of the fixed geometry component so that it has a response to incident light from outside the enclosure based on the shape and dimensions of the conformal surface; wherein said response is based on one of interference, diffraction, and reflection.

2. The device of claim 1, wherein the conformal surface is non-planar.

3. The device of claim 2, wherein conformal surface is provided by discreet planar elements that are linearly spaced apart.

4. The device of claim 3, wherein the device acts as a diffraction grating when the motiles conform to the conformal surface provided by the discreet planar elements.

5. The device of claim 1, wherein the conformal surface is three-dimensional.

6. The device of claim 5, wherein the conformal surface is provided by discreet rod shaped elements.

7. The device of claim 6, wherein the conformal surfaces provided by the discreet rod shaped elements in combination with the motiles produce diffraction and interference effects on incident light.

8. The device of claim 1, wherein the fixed geometry component is produced using a mass replication technique.

9. The device of claim 8, wherein the mass replication technique is selected from the group consisting of embossing, micro-embossing, stamping, electroforming, thermoforming, printing, and injection molding.

10. The device of claim 1, wherein the displacement mechanism applies an electrostatic force to displace the motiles.

11. The device of claim 1, wherein displacement mechanism is selected from the group consisting of a magnetic, a thermal, and an acoustic displacement mechanism.

12. A device for modulating light, comprising:
a light modulating component in the form of a three walled structures disposed in a linear configuration, each defining a cavity, each walled structure having an upper and a lower wall, with a spacing between the upper and lower walls being fixed and different for each walled structure;
a plurality of movable particles located within the light modulating component; and
a displacement mechanism to cause the movable particles to move from a non-activated condition to an activated condition in which the movable particles conform to at least one of the upper and lower walls, the spacing between the upper and lower walls being selected to control interference of light incident on the device when the movable particles are in the activated condition.

13. The device of claim 12, wherein the light modulating particles include nano-scale particles.

14. The device of claim 12, wherein the displacement mechanism applies an electrostatic force to the movable particles to cause displacement thereof.

15. A device for modulating light, comprising:
an enclosure;
a transparent fixed geometry component located within the enclosure said fixed geometry component being optically neutral when the device is in a first mode, but has a shape to achieve a particular optical response corresponding to a second mode by virtue of a plurality of motiles at least partially conforming thereto in the second mode; wherein the optical response is based on one of interference, diffraction, and reflection, wherein the fixed geometry component comprises three walled structures disposed in a linear configuration, each defining a cavity, wherein one of the walls of each structure forms a conformal surface, and wherein each walled structure is of a different size and produces a different optical response to incident light when said motiles conform to the conformal surface thereof; and
a displacement mechanism to cause the motiles to at least partially conform to the fixed geometry component in the second mode.

16. The device of claim 15, wherein the conformal surface fixed geometry component is not planar.

* * * * *